(12) United States Patent
Mishra et al.

(10) Patent No.: US 11,847,087 B2
(45) Date of Patent: Dec. 19, 2023

(54) SYSTEMS AND METHODS FOR CHIP OPERATION USING SERIAL PERIPHERAL INTERFACE (SPI) WITH REDUCED PIN OPTIONS

(71) Applicant: QUALCOMM Incorporated, San Diego, CA (US)

(72) Inventors: Lalan Jee Mishra, San Diego, CA (US); Radu Pitigoi-Aron, San Jose, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/477,250

(22) Filed: Sep. 16, 2021

(65) Prior Publication Data
US 2023/0083877 A1 Mar. 16, 2023

(51) Int. Cl.
G06F 13/42 (2006.01)
G06F 13/32 (2006.01)
G06F 13/38 (2006.01)

(52) U.S. Cl.
CPC .......... *G06F 13/4282* (2013.01); *G06F 13/32* (2013.01); *G06F 13/387* (2013.01)

(58) Field of Classification Search
CPC ..... G06F 13/4282; G06F 13/32; G06F 13/387
See application file for complete search history.

(56) References Cited

U.S. PATENT DOCUMENTS

| 8,250,287 | B1 * | 8/2012 | Mirichigni | G06F 13/00 |
| | | | | 710/65 |
| 10,289,601 | B1 * | 5/2019 | Kim | G06F 21/606 |
| 10,606,794 | B1 * | 3/2020 | Kollmitzer | G06F 13/4291 |
| 2008/0109582 | A1 | 5/2008 | Chen | |
| 2012/0212780 | A1 * | 8/2012 | Fujimoto | B41J 2/0458 |
| | | | | 358/1.15 |

(Continued)

OTHER PUBLICATIONS

Anonymous: "I2C—Wikipedia", Aug. 29, 2021 (Aug. 29, 2021), XP055981748, 17 Pages.
Anonymous: "Serial Peripheral Interface—Wikipedia", Aug. 28, 2021 (Aug. 28, 2021), XP055982009, 18 Pages.

(Continued)

*Primary Examiner* — Henry Tsai
*Assistant Examiner* — Harry Z Wang
(74) *Attorney, Agent, or Firm* — W&T/Qualcomm

(57) ABSTRACT

Systems and methods for chip operation using serial peripheral interface (SPI) with reduced pin options contemplate eliminating the chip select pins, interrupt pins and/or reset pins for host (also referred to as master)-to-device (also referred to as slave) communication links, while preserving the possibility of backward compatibility for legacy devices if desired. The communication link may include a clock line, a host-to-device line, and a device-to-host line. The host may use specific sequences of signals on the clock and host-to-device line to provide start and stop sequence commands, interrupts, or reset commands. By consolidating these commands onto the clock and host-to-device line, pin count may be reduced for portions of the host and slave circuits. Likewise, fewer (or at least shorter potentially) conductive traces may be needed to interconnect the host to the device. Such changes may save cost, make layout design easier, and/or save space within a computing device.

21 Claims, 13 Drawing Sheets

(56) References Cited

U.S. PATENT DOCUMENTS

| | | | |
|---|---|---|---|
| 2013/0060980 A1* | 3/2013 | Zitlaw | G06F 13/4291 710/107 |
| 2013/0297829 A1* | 11/2013 | Berenbaum | G06F 13/4256 710/36 |
| 2014/0075072 A1* | 3/2014 | Alley | G06F 13/4291 710/110 |
| 2014/0136738 A1* | 5/2014 | Matlock | G06F 13/4282 710/104 |
| 2015/0100712 A1* | 4/2015 | Sengoku | G06F 13/36 710/110 |
| 2016/0164860 A1* | 6/2016 | Dunne | H04L 63/0815 726/8 |
| 2016/0170930 A1* | 6/2016 | Weng | G06F 1/26 710/110 |
| 2017/0083467 A1* | 3/2017 | Mishra | G06F 13/4282 |
| 2017/0185548 A1* | 6/2017 | Sakuma | G06F 13/4282 |
| 2018/0173667 A1* | 6/2018 | Mishra | G06F 13/4282 |
| 2019/0155781 A1* | 5/2019 | Amarilio | G06F 13/364 |
| 2020/0371977 A1* | 11/2020 | Sangolli | G06F 13/28 |
| 2021/0240656 A1* | 8/2021 | Rumpler | G06F 9/3012 |

OTHER PUBLICATIONS

Kouche A.E., et al., "WSN Platform Plug-and-Play (PnP) Customization", 2014 IEEE Ninth International Conference On Intelligent Sensors, Sensor Networks and Information Processing (ISSNIP), IEEE, Apr. 21, 2014 (Apr. 21, 2014), pp. 1-6, XP032604420, DOI: 10.1109/ISSNIP.2014.6827642, p. 2, paragraph 6-paragraph 11.

Invitation to Pay Additional Fees and Partial International Search for International Patent Application No. PCT/US2022/075562, dated Nov. 29, 2022, 8 pages.

Texas: "KeyStone Architecture Serial Peripheral Interface (SPI)", Mar. 31, 2012 (Mar. 31, 2012), pp. 1-51, XP055861324, p. 19-p. 20, p. 22-p. 23.

International Search Report and Written Opinion for International Patent Application No. PCT/US2022/075562, dated Jan. 23, 2023, 17 pages.

* cited by examiner

SYSTEMS AND METHODS FOR CHIP OPERATION USING SERIAL PERIPHERAL INTERFACE (SPI) WITH REDUCED PIN OPTIONS

BACKGROUND

I. Field of the Disclosure

The technology of the disclosure relates generally to communication between integrated circuits (ICs) that operate using the serial peripheral interface (SPI) specification.

II. Background

Computing devices abound in modern society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences.

In many instances, the functions may be enabled by having circuits on different dies or chips that communicate with one another. For example, a processor chip may communicate with a memory chip or a sensor chip. Various standards and protocols have been developed to assist in such communication. One popular standard for low-speed communication is the serial peripheral interface (SPI) specification. SPI is widely adopted. Accordingly, improvements to SPI may provide disproportionate impact across a computing device.

SUMMARY

Aspects disclosed in the detailed description include systems and methods for chip operation using serial peripheral interface (SPI) with reduced pin options. In particular, exemplary aspects contemplate eliminating the chip select pins, interrupt pins, and/or reset pins for host (also referred to as master)-to-device (also referred to as slave) communication links, while preserving the possibility of backward compatibility for legacy devices if desired. The communication link may include a clock line, a host-to-device line, and a device-to-host line. The host may use specific sequences of signals on the clock line and the host-to-device line to provide start and stop sequence commands, interrupts, or reset commands. By consolidating these commands onto the clock line and the host-to-device line, pin count may be reduced for portions of the host and slave circuits. Likewise, fewer (or at least shorter potentially) conductive traces may be needed to interconnect the host to the device. Such changes may save cost, make layout design easier, and/or save space within a computing device.

In this regard in one aspect, an integrated circuit (IC) is disclosed. The IC includes a bus interface. The bus interface includes a clock pin configured to couple to a clock line on an associated bus. The bus interface also includes a host-to-subordinate pin configured to couple to the associated bus. The bus interface also includes a subordinate-to-host pin configured to couple to the associated bus. The IC also includes a control circuit. The control circuit is configured to change a logical state of the host-to-subordinate pin, subsequently activate the clock line, and subsequently send an address and command through the host-to-subordinate pin.

In another aspect, an IC is disclosed. The IC includes a bus interface. The bus interface includes a clock pin configured to couple to a clock line on an associated bus. The bus interface also includes a host-to-subordinate pin configured to couple to the associated bus. The bus interface also includes a subordinate-to-host pin configured to couple to the associated bus. The IC also includes a control circuit. The control circuit is configured to change a state on the host-to-subordinate pin from a logical idle state to an asserted state. While holding the host-to-subordinate pin in the asserted state, the control circuit is also configured to toggle the clock pin a predetermined number of times to signal a reset.

In another aspect, an IC is disclosed. The IC includes a bus interface. The bus interface includes a clock pin configured to couple to a clock line on an associated bus. The bus interface also includes a host-to-subordinate pin configured to couple to the associated bus. The bus interface also includes a subordinate-to-host pin configured to couple to the associated bus. The IC also includes a control circuit. While in a logical idle state, the control circuit is configured to detect a change of state on the subordinate-to-host pin caused by a subordinate chip. Responsive to the change of state on the subordinate-to-host pin, the control circuit is configured to start a clock signal on the clock pin.

In another aspect, a system is disclosed. The system includes a subordinate chip. The system also includes a bus coupled to the subordinate chip. The system also includes a host chip. The host chip includes a bus interface. The bus interface includes a clock pin configured to couple to a clock line on the bus. The bus interface also includes a host-to-subordinate pin configured to couple to the bus. The bus interface also includes a subordinate-to-host pin configured to couple to the bus. The host chip also includes a control circuit. The control circuit is configured to change a logical state of the host-to-subordinate pin, subsequently activate the clock line, and subsequently send an address and command through the host-to-subordinate pin to indicate a chip select to the subordinate chip. The control circuit is also configured to change a state on the host-to-subordinate pin from a logical idle state to an asserted state. While holding the host-to-subordinate pin in the asserted state, the control circuit is configured to toggle the clock pin a predetermined number of times to signal a reset to the subordinate chip. While in the logical idle state, the control circuit is configured to detect a change of state on the subordinate-to-host pin caused by the subordinate chip. Responsive to the change of state on the subordinate-to-host pin, the control circuit is configured to start a clock signal on the clock pin.

DETAILED DESCRIPTION

Figure 1:
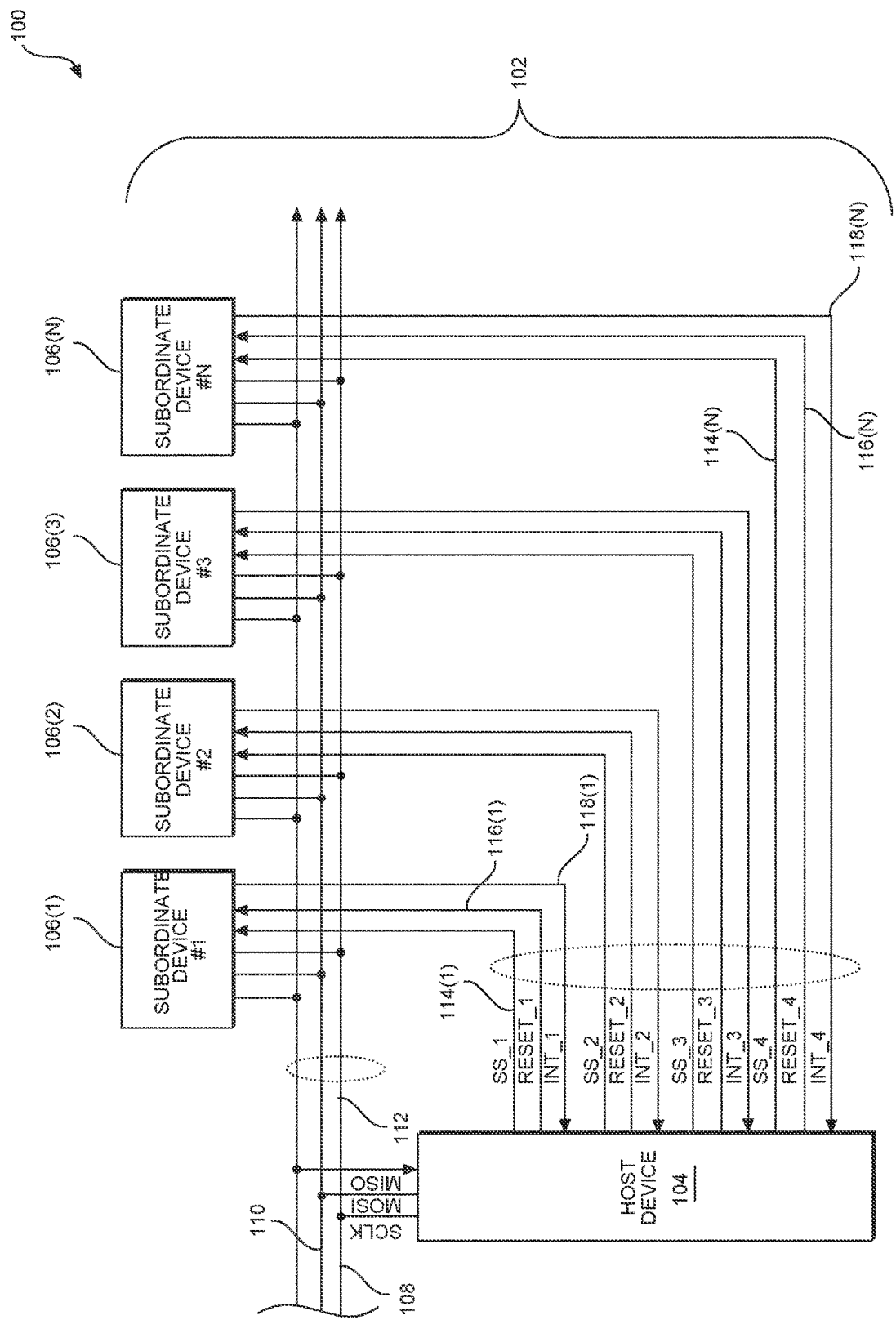
FIG. 1 is a block diagram of a conventional chip-to-multiple chip system that uses serial peripheral interface (SPI) to communicate.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for chip operation using serial peripheral interface (SPI) with reduced pin options. In particular, exemplary aspects contemplate eliminating the chip select pins, interrupt pins and/or reset pins for host (also referred to as master)-to-device (also referred to as slave) communication links, while preserving the possibility of backward compatibility for legacy devices if desired. The communication link may include a clock line, a host-to-device line, and a device-to-host line. The host may use specific sequences of signals on the clock and host-to-device line to provide start and stop sequence commands, interrupts, or reset commands. By consolidating these commands onto the clock and host-to-device line, pin count may be reduced for portions of the host and slave circuits. Likewise, fewer (or at least shorter potentially) conductive traces may be needed to interconnect the host to the device. Such changes may save cost, make layout design easier, and/or save space within a computing device.

A brief overview of a chip-to-multiple chip system that uses an SPI link is provided in FIGS. 1-3, and a discussion of exemplary aspects of the present disclosure begins below with reference to FIG. 4.

In this regard, FIG. 1 is a block diagram of an example chip-to-multiple chip system 100 that uses an SPI link 102 to communicate between chips. As used herein, a chip is an integrated circuit (IC) or monolithic IC that has a set of electronic circuits on one small piece of semiconductor material such as silicon. It should be appreciated that a plurality of chips may be stacked to form a system in a package (SiP) that may be a number of ICs enclosed in one or more chip carrier packages that may be stacked using package-on-package. The SiP performs all or most of the functions of an electronic system, and is typically used inside a mobile phone, digital music player, etc. Dies containing ICs may be stacked vertically on a substrate. The dies are internally connected by fine wires that are bonded to the package. Alternatively, with a flip chip technology, solder bumps are used to join stacked chips together. A SiP is like a system on a chip (SoC) but less tightly integrated and not on a single semiconductor die.

With continued reference to FIG. 1 a first chip 104 may be a host IC. Historically, a host IC might be referred to as a master IC and such terminology may be used interchangeably herein. The first chip 104 is coupled through the SPI link 102 to a plurality of second chips 106(1)-106(N). The second chips 106(1)-106(N) may be referred to as device chips, subordinate chips, or slave chips. Slave chips is a term that is used historically and, while it can still be found in current literature, the term is falling out of favor in view of alternate terms, although there is no clear consensus as of this writing as to what term is the most appropriate replacement. The SPI link 102 includes a clock line (SCLK) 108, a master out, slave in (MOSI) line 110, a master in, slave out (MISO) line 112, and a slave select (SS) line 114(1)-114(N). The slave select line 114(1)-114(N) is also commonly referred to as a chip select (CS) line. Further, the SPI link 102 may include a reset line 116(1)-116(N) and an interrupt line 118(1)-118(N). Per the SPI protocol, each second chip 106(1)-106(N) has a dedicated SS line 114(1)-114(N), reset line 116(1)-116(N), and interrupt line 118(1)-118(N).

The presence of the dedicated lines 114(1)-114(N), 116(1)-116(N), and 118(1)-118(N) adds to the number of pins required in the first chip 104 and the second chips 106(1)-106(N). In particular, the first chip 104 may have an additional number of pins 3*(N−1)(i.e., three extra pins for each additional second chip beyond the second chip 106(1)). Pins are generally considered expensive, both in terms of material/manufacturing cost, and also in terms of space requirements. Further, the additional pins must be connected to one another via conductive lines, which requires additional space and materials, adding to the expense of the device.

Figure 2:
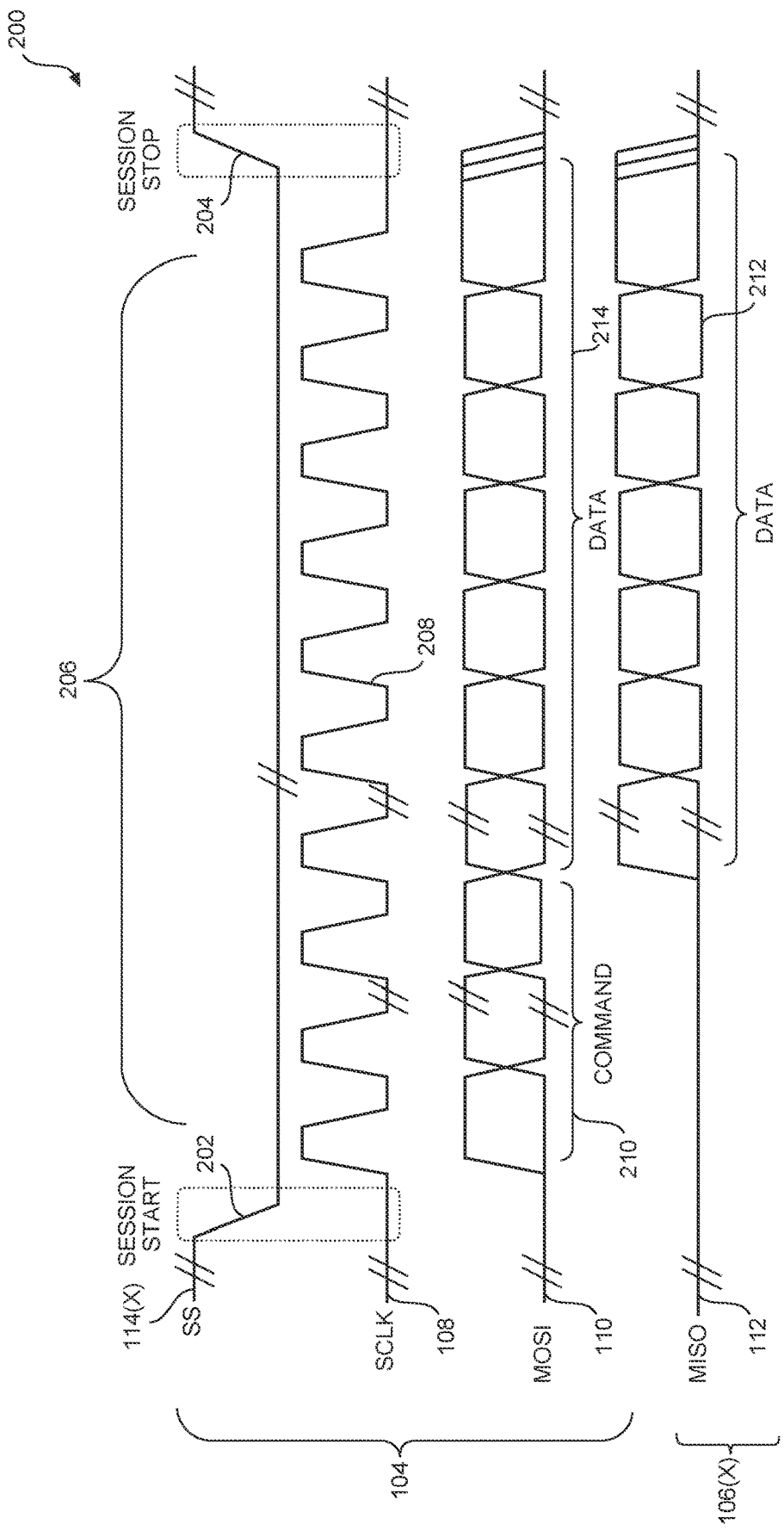
FIG. 2 is a signaling diagram showing how lines within an SPI link may be used in a conventional SPI link.
Figure 3:
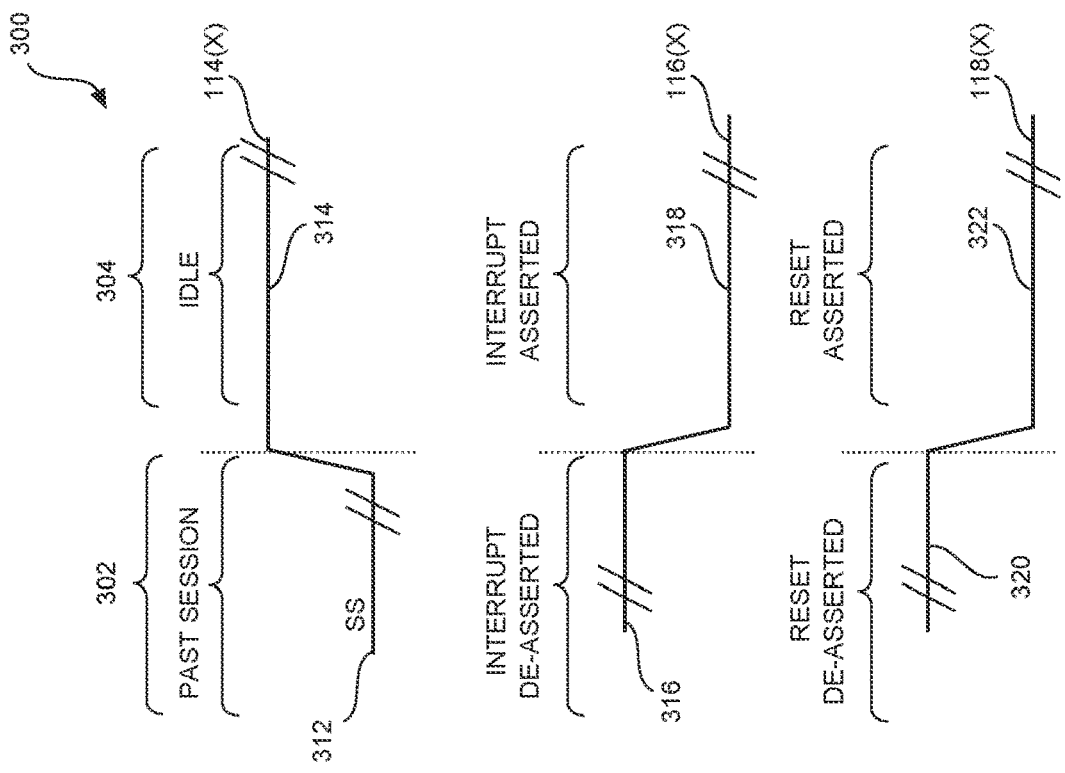
FIG. 3 is a signaling diagram showing how interrupt and reset lines within an SPI link may be used in a conventional SPI link
Figure 3:
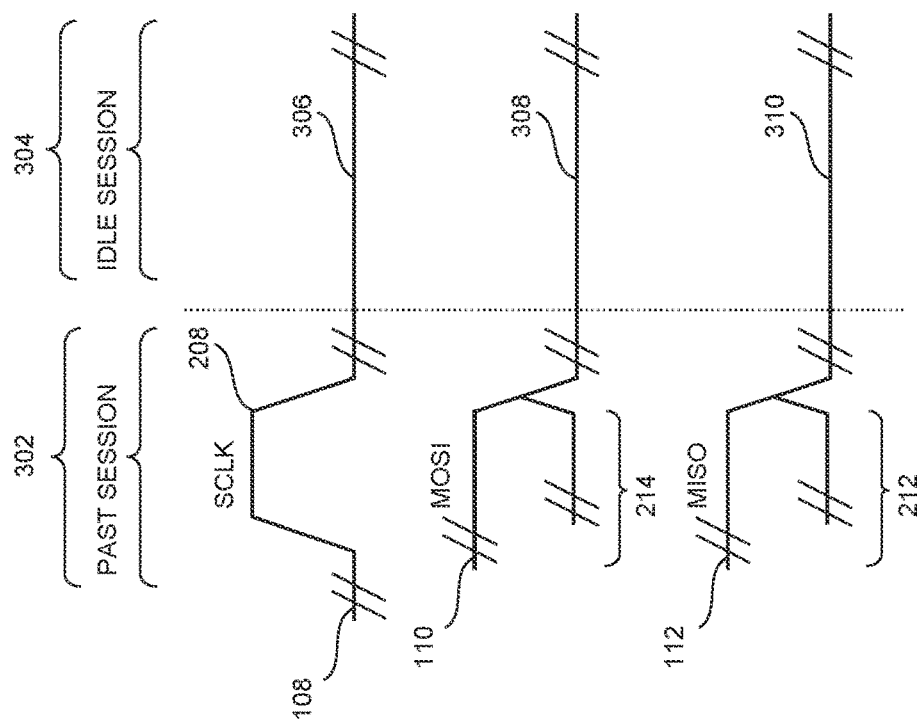

FIGS. 2 and 3 illustrate signaling diagrams reflective of signals that pass on a typical SPI link 102. In this regard, FIG. 2 illustrates activity 200 on the clock line 108, MOSI line 110, MISO line 112, and a SS line 114(X). It should be appreciated that the first chip 104 controls the clock line 108, the MOSI line 110, and the SS line 114(X), while a second chip 106(X) controls the MISO line 112. The SS lines 114(1)-114(N) are used to indicate which of the second chips 106(1)-106(N) are active and should be reading from the MOSI line 110 and are authorized to send signals on the MISO line 112. In particular, the first chip 104 indicates a valid transaction phase by asserting a logical low on the SS line 114(X) during the active transaction. The falling edge 202 indicates a start of transaction and a rising edge 204 indicates an end of transaction. During the valid transaction window 206, the clock line 108 provides a clock signal 208. The first chip 104 may send a command 210 on the MOSI line 110 in the valid transaction window 206, which causes the second chip 106(X) to send responsive data 212 on the MISO line 112. The first chip 104 may also send data 214 to the second chip 106(X) during the transaction window 206.

FIG. 3 provides typical activity 300 for the SPI link 102. During a past active session 302, the clock line 108 may have the clock signal 208 thereon, but during an idle session 304, the clock line 108 may stay at a logical low 306. Likewise, during the past active session 302, the MOSI line 110 and MISO line 112 may have data 214 and 212 thereon as discussed above for FIG. 2, but are at logical lows 308, 310, respectively during the idle session 304. As suggested in FIG. 2, the SS line 114(X) is at a logical low 312 during the past active session 302, and at a logical high 314 during the idle session 304. In contrast, the interrupt line 116(X) may be held at a logical high 316 during the past active session 302, but may be brought to a logical low 318 during the idle session 304 when the second chip 106(X) asserts an interrupt. Similarly, the reset line 118(X) may be held at a logical high 320 during the past active session 302 and brought to a logical low 322 when the first chip 104 asserts a reset.

It should be appreciated that SPI is a low-speed (typically below 50 megahertz (MHz) and more commonly below 10 MHz with throughput ranges around 10 megabits per second (Mbps) to 50 Mbps), synchronous serial communication interface specification used for short-distance communication, primarily in embedded systems. Thus, while exemplary aspects of the present disclosure focus on SPI as an exemplary aspect, the present disclosure is not so limited. Other synchronous serial communication systems that employ full duplex communication and include a slave or chip select lines, reset lines, and/or interrupt lines may also benefit from the present disclosure.

The SPI specification has proven useful since its introduction in the mid-1980s. However, more modern computing devices may have a central application processor or modem that has numerous associated affiliated chips. Each of these affiliated chips on the SPI link 102 has six pins to handle the SPI signaling. The host chip likewise has numerous pins to accommodate all the lines. Routing the various lines between a host and a plurality of affiliated chips can be challenging. Each of these facts contributes to a desire to simplify the SPI link.

Exemplary aspects of the present disclosure allow the elimination of the chip or slave select line, the reset line, and/or the interrupt line as well as elimination of corresponding pins from both ends of an SPI link. Exemplary aspects of the present disclosure not only eliminate these lines and pins, but also preserve the functions of these lines by introducing a signaling sequence between the host and the device using the remaining lines. Further, the host chip may have pin capacity to operate legacy lines for affiliated chips which have not been upgraded to include aspects of the present disclosure.

Figure 4:
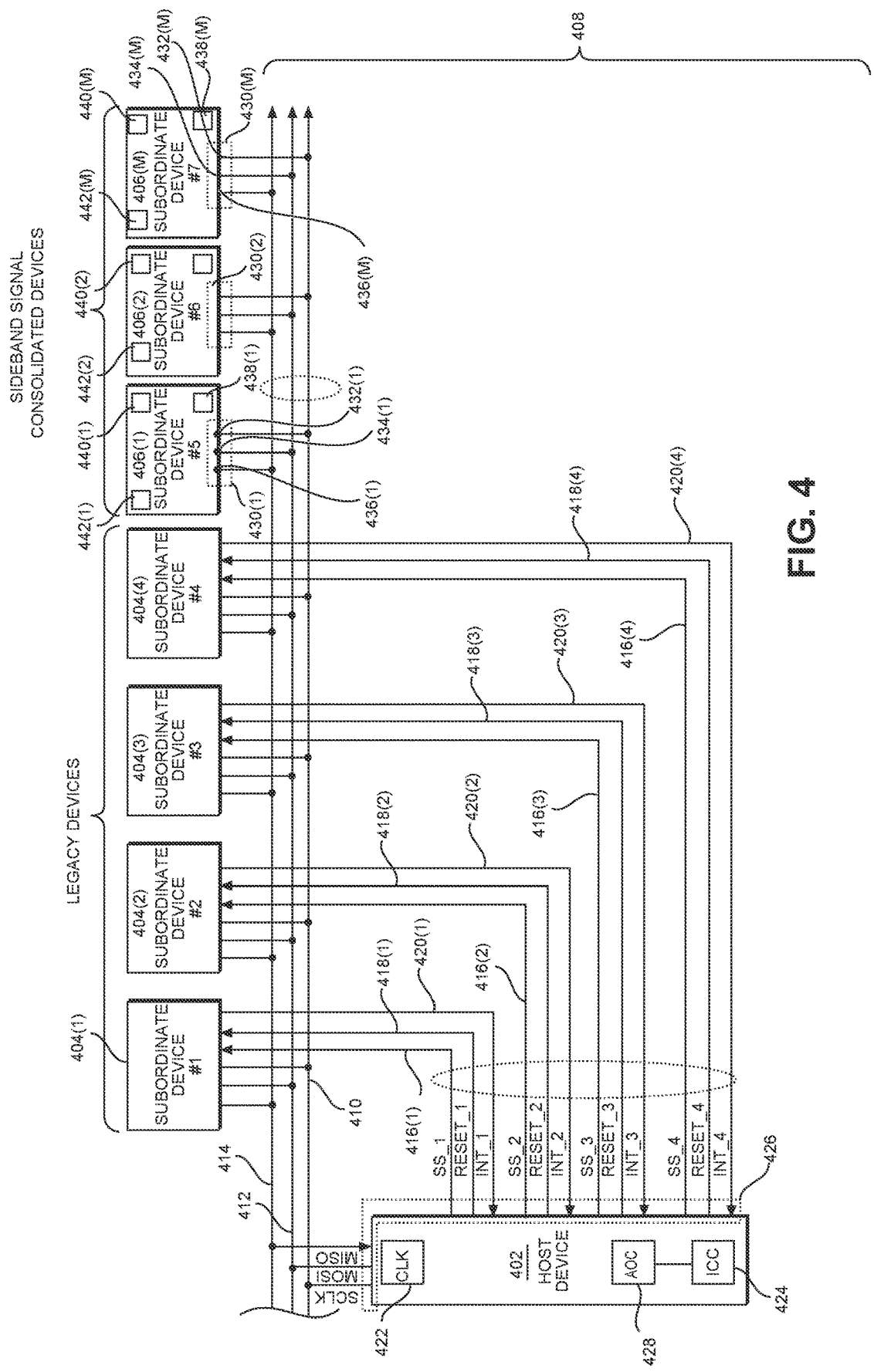
FIG. 4 is a block diagram of a chip-to-multiple chip system that uses serial peripheral interface (SPI) to communicate with both legacy devices and devices according to the consolidated pin options of the present disclosure.

An exemplary system 400 with consolidated pins and lines according to exemplary aspects of the present disclosure is illustrated in FIG. 4. The system 400 includes a host (or master) chip 402 coupled to legacy subordinate (or slave) chips 404(1)-404(4) and consolidated subordinate chips 406(1)-406(M) by an SPI link 408. The SPI link 408 has a shared clock (SCLK) line 410, a shared MOSI line 412 (more generically referred to as a host-to-subordinate line), and a shared MISO line 414 (more generically referred to as a subordinate-to-host line) that extends to all the chips 404(1)-404(4) and 406(1)-406(M). However, the SPI link 408 only includes SS lines 416(1)-416(4), reset lines 418(1)-418(4), and interrupt lines 420(1)-420(4) for the legacy subordinate chips 404(1)-404(4). According to exemplary aspects of the present disclosure, the functionality of the slave select line, reset line, and interrupt line is provided on the clock line 410, MOSI line 412, and MISO line 414.

The host chip 402 may include a clock 422 and a control circuit 424 as well as a bus interface 426 (sometimes referred to as a host bus interface). The bus interface 426 may include one or more pins (not shown explicitly) configured to couple to the clock line 410, the MOSI line 412, and the MISO line 414 as well as the SS lines 416(1)-416(4), reset lines 418(1)-418(4), and interrupt lines 420(1)-420(4). Additionally, the host chip 402 may include an always on circuit (AOC) 428 that may detect changes in the voltage levels on the SPI link 408 even when the SPI link 408 is idle or in a low-power state.

The legacy subordinate chips 404(1)-404(4) are legacy devices and are well understood. However, the subordinate chips 406(1)-406(M) have been modified to eliminate an SS pin, a reset pin, and an interrupt pin. Thus, the subordinate chips 406(1)-406(M) may include a bus interface 430(1)-430(M) that includes a clock pin 432(1)-432(M), a MOSI pin 434(1)-434(M) (more generically a host-to-subordinate pin), and a MISO pin 436(1)-436(M) (more generically a subordinate-to-host pin). The subordinate chips 406(1)-406(M) may further include an AOC 438(1)-438(M) and a control circuit 440(1)-440(M). Optionally, the subordinate chips 406(1)-406(M) may include an internal clock 442(1)-442(M). The subordinate chips 406(1)-406(M) may have an address assigned to them at system start or manufacturing which is made known to the host chip 402 and stored in memory associated with the AOC 438(1)-438(M) or the control circuit 440(1)-440(M).

Exemplary aspects of the present disclosure allow the host chip 402 to send chip select signals, session start signals, and reset signals through the clock line 410 and the MOSI line 412 while the subordinate chips 406(1)-406(M) may send interrupt signals on the MISO line 414. FIGS. 5A-8B provide an explanation through signaling diagrams and associated flowcharts of how this signaling may be done.

Figure 5A:
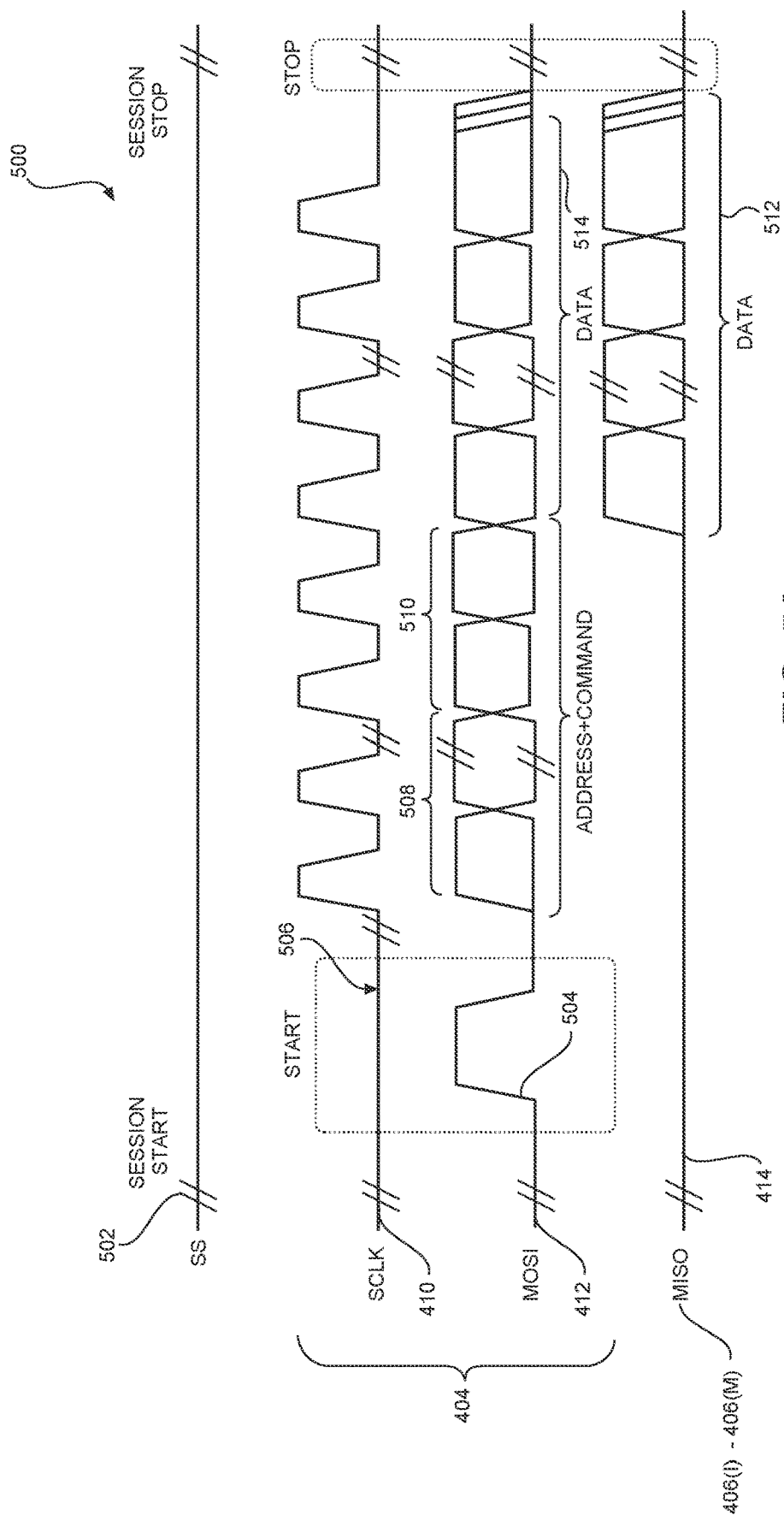
FIG. 5A is a signaling diagram showing start and stop condition sequences for the system of FIG. 4.

In this regard, FIG. 5A shows through a signaling diagram 500 how exemplary aspects of the present disclosure provide a chip select signal without using a SS line. In this regard, the host chip 402 may initiate a session at session start time 502. The host chip 402 asserts a signal 504 on the MOSI line 412 (e.g., if the idle state is a logical low, the host chip 402 raises the signal 504 to a logical high) while holding the clock line 410 at the idle state 506 (e.g., a logical low). Subsequent to this initial signal, the host chip 402 provides an address sequence signal 508 on the MOSI line 412 followed by a command sequence signal 510. The address sequence signal 508 includes the address of the target subordinate chip 406(1)-406(M). The AOC 438(1)-438(M) of the subordinate chip 406(1)-406(M) reads this address sequence signal 508 to determine if the address corresponds to the address stored locally. If there is a match, the control circuit 440(1)-440(M) processes the command sequence signal 510 and responds with a data signal 512 on the MISO line 414. The host chip 402 may also send a data signal 514 on the MOSI line 412 if needed or desired.

At the end of the sequence, the host chip 402 may send a stop command on the MOSI line 412, may hold the clock line 410 idle for a predetermined amount of time as measured by the internal clock 442(1)-442(M) or the like.

Figure 5B:
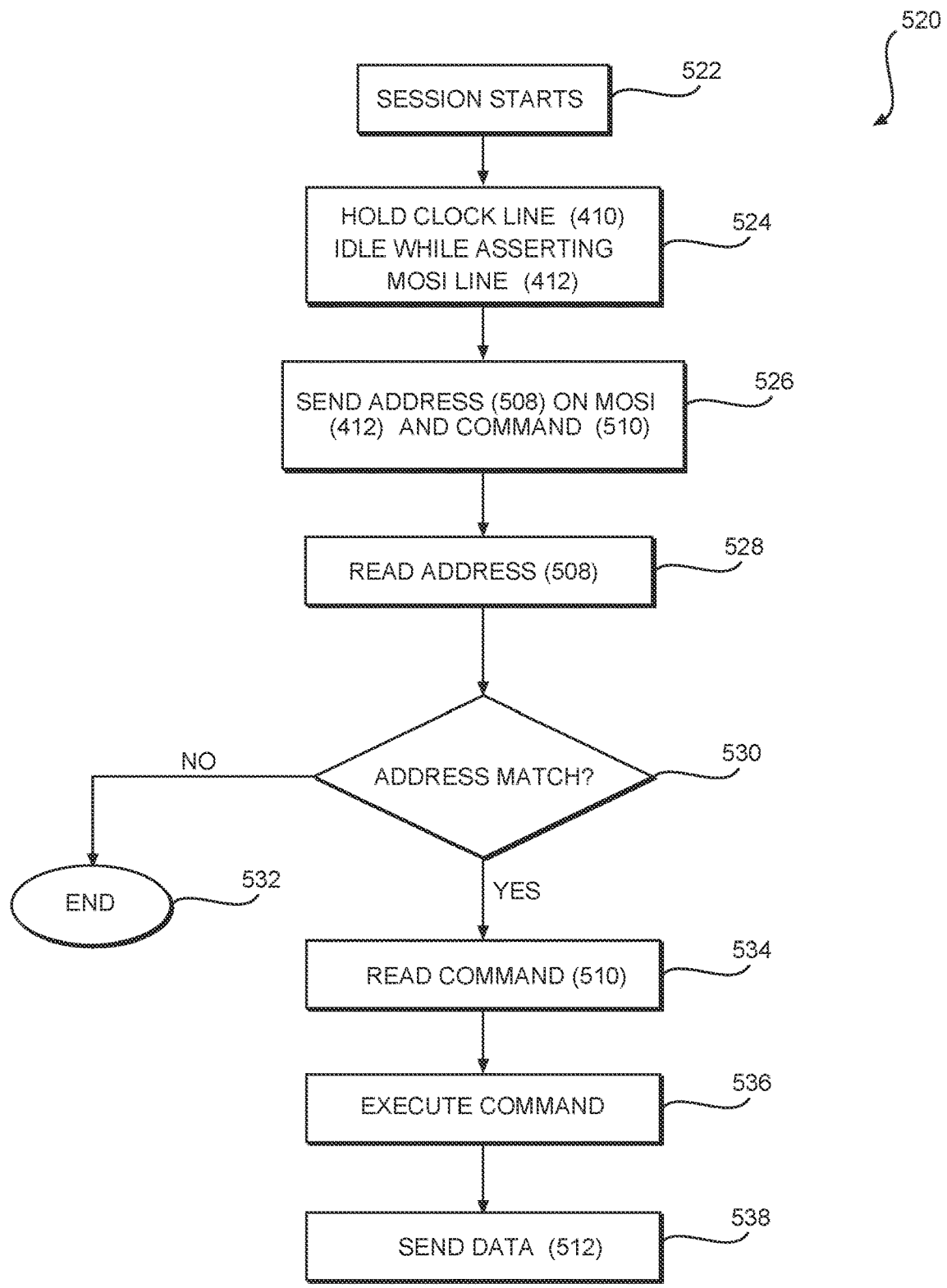
FIG. 5B is a flowchart showing a process corresponding to the signaling diagram of FIG. 5A.

A process 520 corresponding to the signaling diagram 500 of FIG. 5A is provided in FIG. 5B. The process 520 begins when the session starts (block 522). The host chip 402 holds the clock line 410 idle while asserting the MOSI line 412 (block 524). The host chip 402 sends the address sequence signal 508 on the MOSI line 412 and then sends the command sequence signal 510 (block 526). The subordinate chips 406(1)-406(M) read the address sequence signal 508 (block 528) and determine if the address matches (block 530). If the address does not match, the process 520 ends (block 532) for that subordinate chip 406. However, if the address does match, the subordinate chip 406(X) reads the command sequence signal 510 (block 534) and executes the command (block 536) such as by sending the data signal 512 (block 538) or receiving the data signal 514.

Note that legacy subordinate chips 404(1)-404(4) ignore the signals on the clock line 410 and the MOSI line 412 because the respective SS lines 416(1)-416(4) have not been activated. Thus, this signaling process readily works with legacy subordinate chips 404(1)-404(4).

Figure 6A:
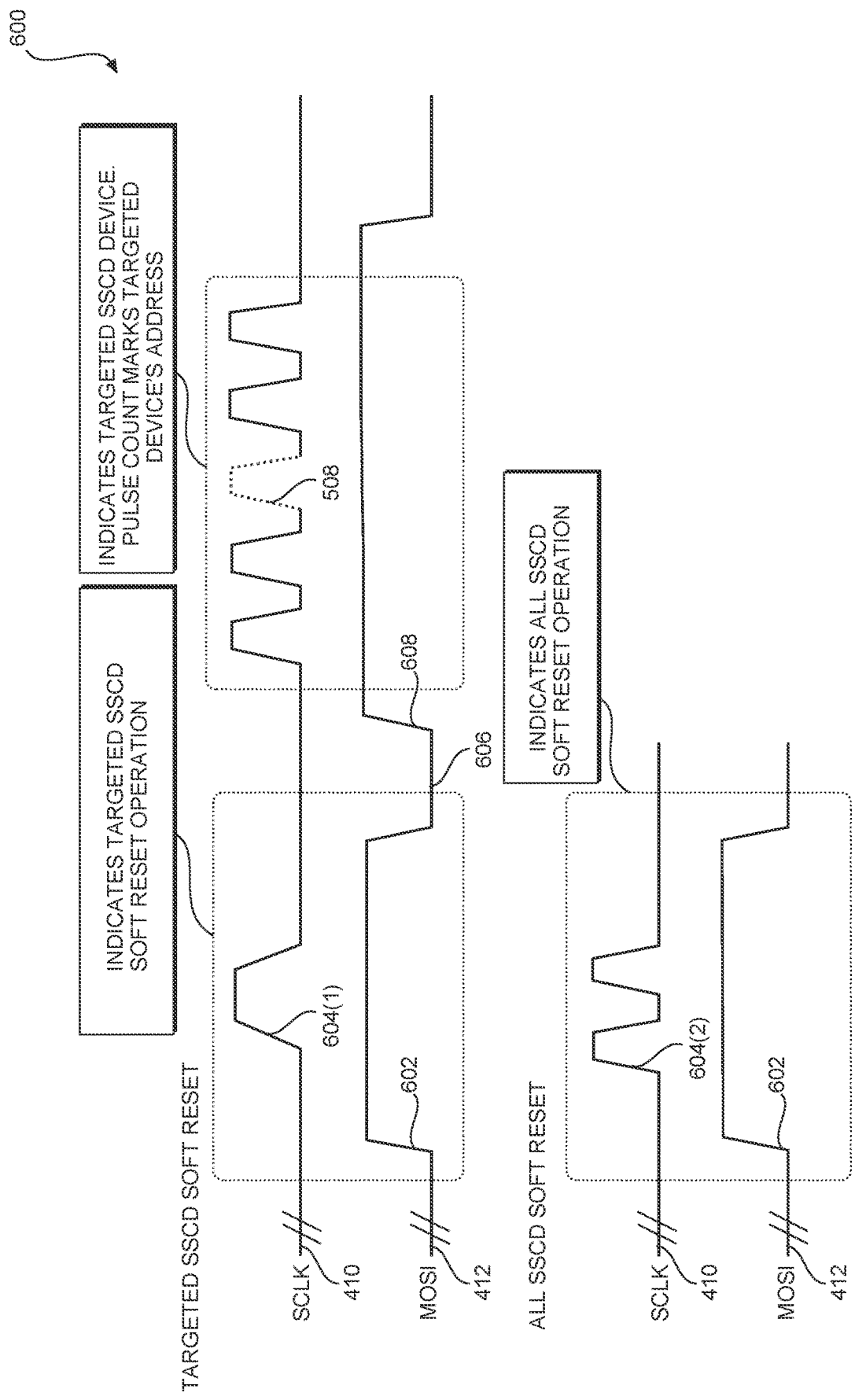
FIG. 6A is a signaling diagram showing possible soft reset sequences of the system of FIG. 4.
Figure 6B:
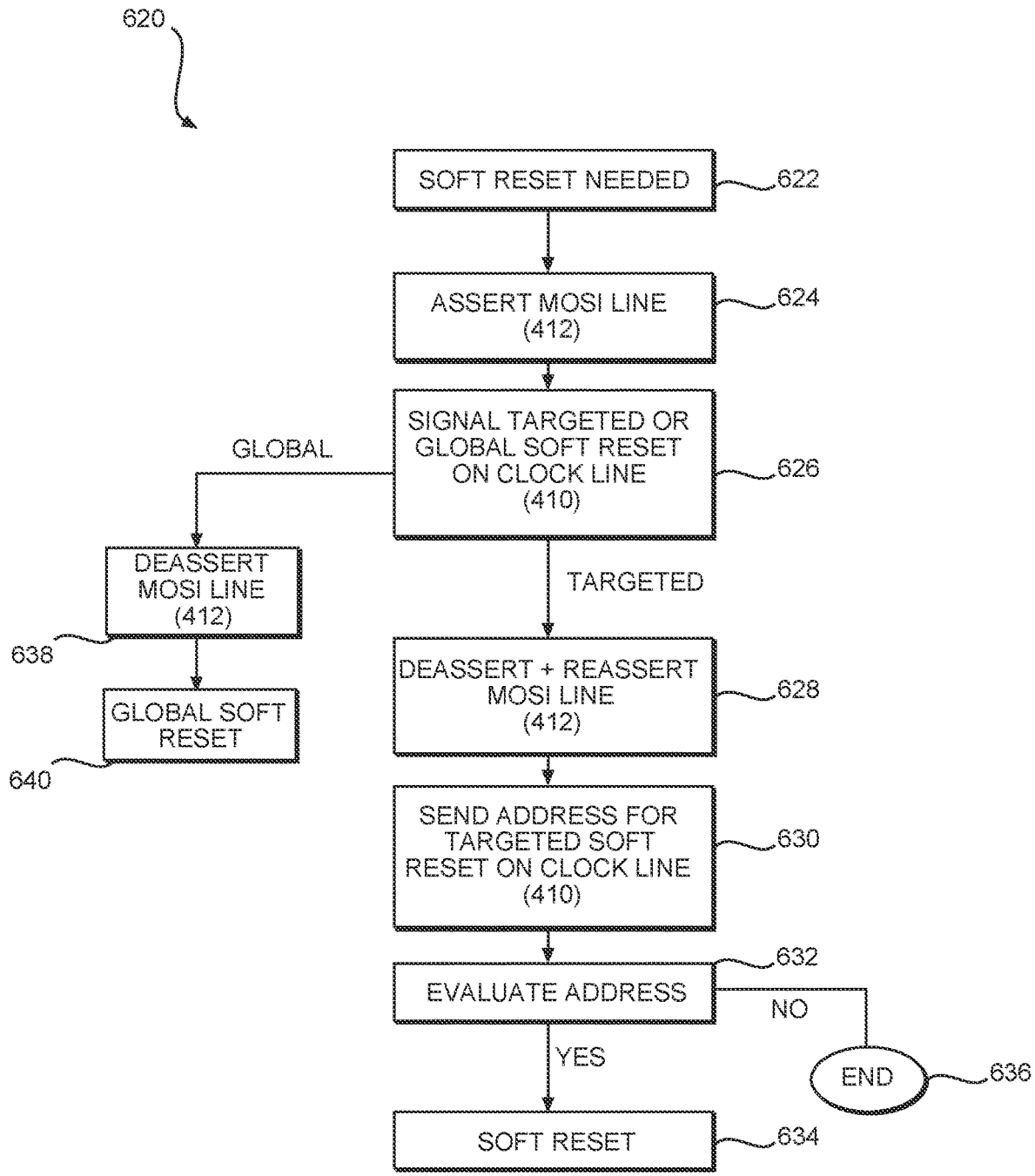
FIG. 6B is a flowchart showing a process corresponding to the signaling diagram of FIG. 6A.

FIGS. 6A and 6B illustrate a signaling diagram 600 and flowchart 620 for a soft reset sequence. In this regard, the host chip 402 determines that one or more subordinate chips 406(1)-406(M) need a soft reset. The host chip 402 initially asserts the MOSI line 412 (indicated generally at 602). While the MOSI line 412 is asserted, the host chip 402 also toggles the clock line 410 once (generally at 604(1)) for a targeted soft reset or twice (generally at 604(2)) for a global soft reset. If the global soft reset has been indicated, then no further signals are required and all the subordinate chips 406(1)-406(M) initiate a soft reset. If, however, a targeted soft reset has been indicated, the host chip 402 deasserts the MOSI line 412 (generally at 606). Subsequently, the host chip 402 asserts the MOSI line 412 again (generally at 608) and then sends the address sequence signal 508 on the clock line 410. The subordinate chips 406(1)-406(M) evaluate the address and if the address matches, the subordinate chip 406(X) initiates the soft reset.

The process 620 is illustrated in FIG. 6B, where the process 620 begins when the host chip 402 determines that a soft reset is needed (block 622). The host chip 402 asserts the MOSI line 412 (block 624). While the MOSI line 412 is asserted, the host chip 402 signals a targeted or global soft reset on the clock line 410 (block 626). If the soft reset is targeted, the host chip 402 deasserts and reasserts the MOSI line 412 (block 628). The host chip 402 then sends the address sequence signal 508 for the target of the soft reset on the clock line 410 (block 630). The subordinate chips 406(1)-406(M) evaluate the address (block 632) and if the address is correct, the subordinate chip 406(X) executes the soft reset (block 634). If the address is not correct, the subordinate chips 406(1)-406(M) end the process (block 636).

If the signal at block 626 is a global reset, the host chip 402 deasserts the MOSI line 412 (block 638) and the subordinate chips 406(1)-406(M) execute the global soft reset (block 640).

Note that legacy subordinate chips 404(1)-404(4) ignore the signals on the clock line 410 and the MOSI line 412 because the reset lines 418(1)-418(4) have not been activated. Thus, to send a targeted soft reset to a specific legacy subordinate chip 404(1)-404(4), the host chip 402 does not execute the process 620 and merely provides an appropriate signal on the appropriate reset line 418(1)-418(4). If a global soft reset is required, then the process 620 is executed concurrently with signaling on all the reset lines 418(1)-418(4).

Figure 7A:
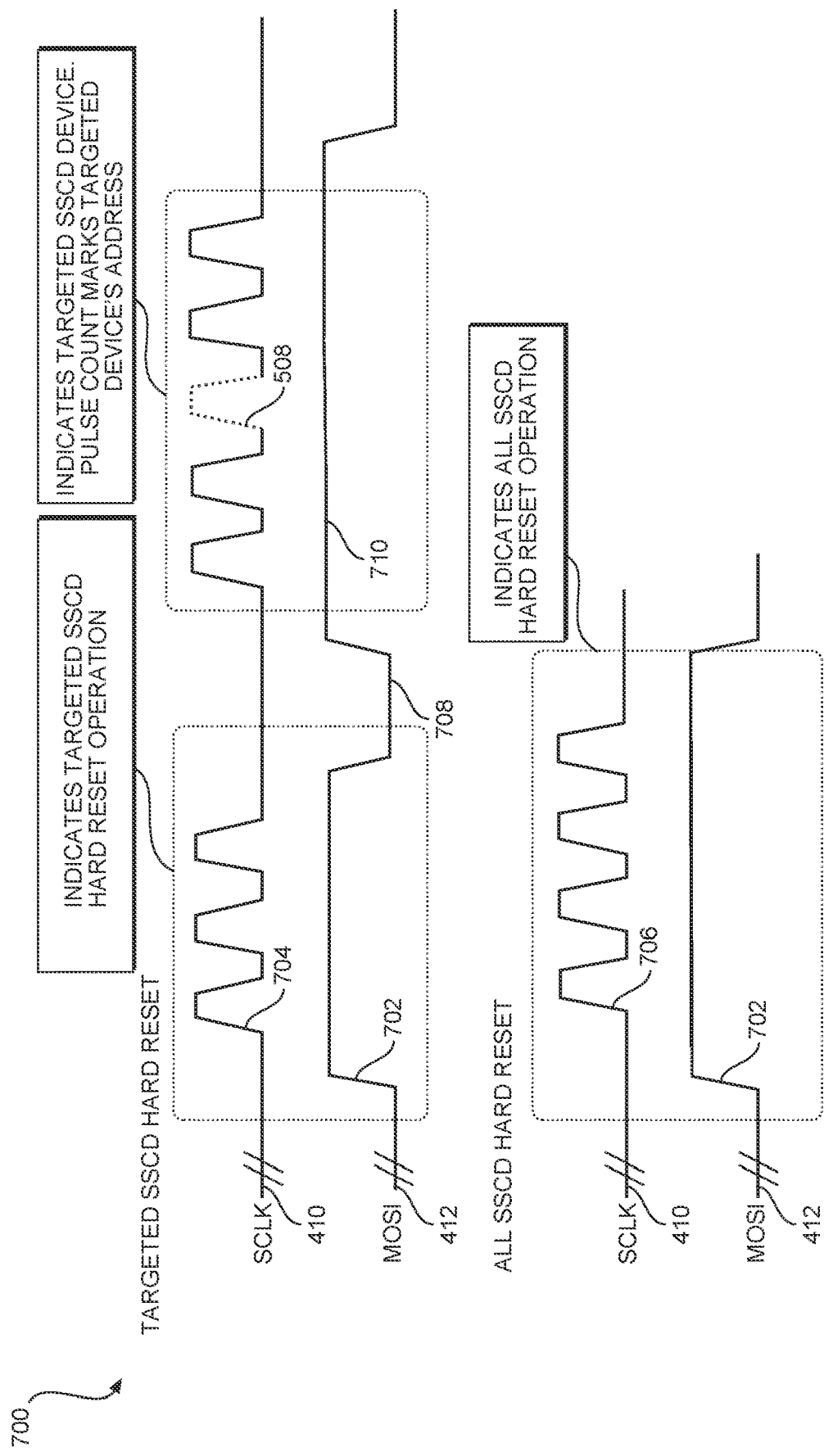
FIG. 7A is a signaling diagram showing possible hard reset sequences of the system of FIG. 4.
Figure 7B:
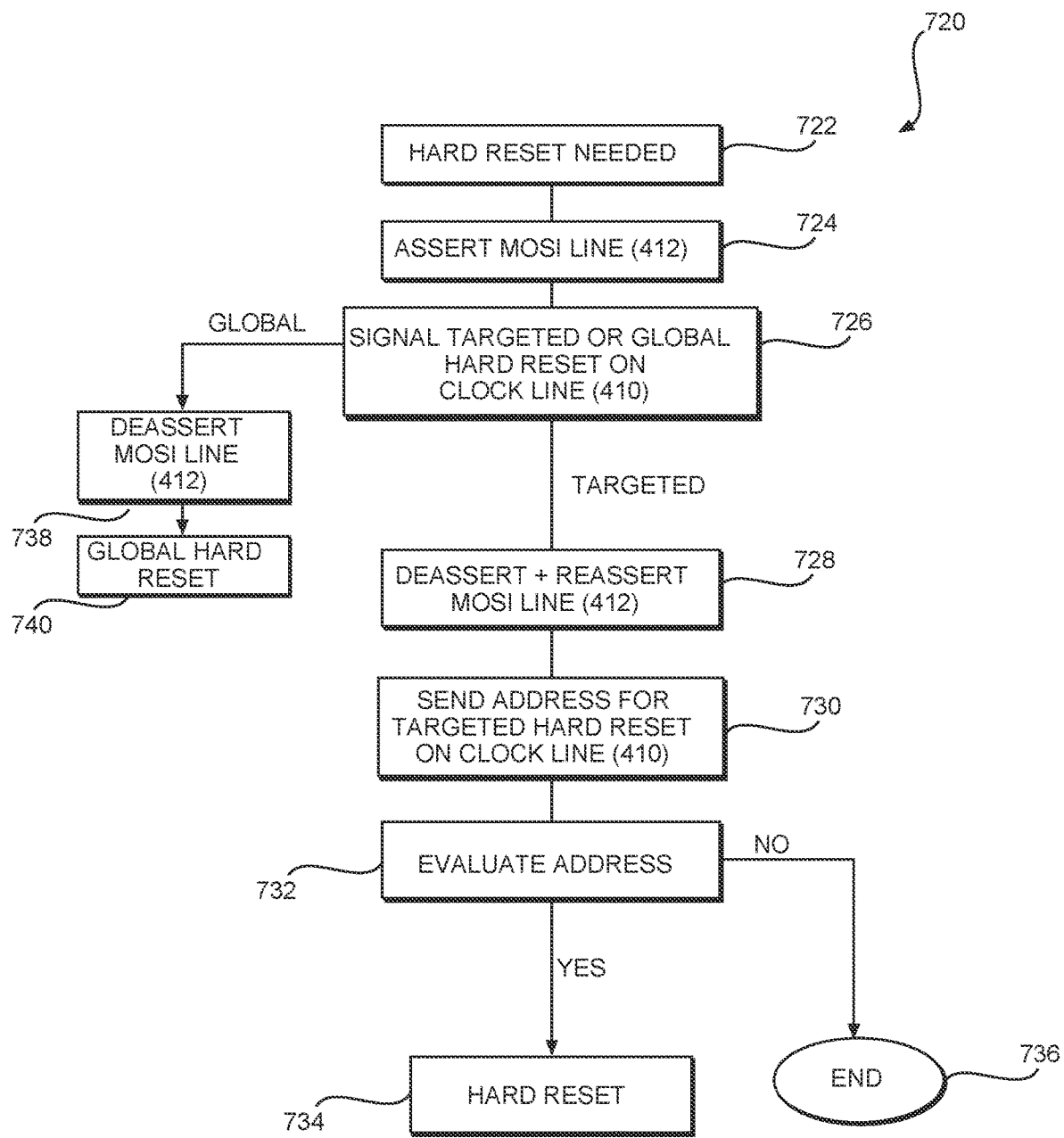
FIG. 7B is a flowchart showing a process corresponding to the signaling diagram of FIG. 7A.

Similarly, FIGS. 7A and 7B illustrate a signaling diagram 700 and flowchart 720 for a hard reset sequence. In this regard, the host chip 402 determines that one or more subordinate chips 406(1)-406(M) need a hard reset. The host chip 402 initially asserts the MOSI line 412 (indicated generally at 702). While the MOSI line 412 is asserted, the host chip 402 also toggles the clock line 410 three times (generally at 704) for a targeted hard reset or four times (generally at 706) for a global hard reset. If the global hard reset has been indicated, then no further signals are required and all the subordinate chips 406(1)-406(M) initiate a hard reset. If, however, a targeted hard reset has been indicated, the host chip 402 deasserts the MOSI line 412 (generally at 708). Subsequently, the host chip 402 asserts the MOSI line 412 again (generally at 710) and then sends the address sequence signal 508 on the clock line 410. The subordinate chips 406(1)-406(M) evaluate the address and if the address is correct, the subordinate chip 406(X) initiates the hard reset.

The process 720 is illustrated in FIG. 7B, where the process 720 begins when the host chip 402 determines that a hard reset is needed (block 722). The host chip 402 asserts the MOSI line 412 (block 724). While the MOSI line 412 is asserted, the host chip 402 signals a targeted or global hard reset on the clock line 410 (block 726). If the hard reset is targeted, the host chip deasserts and resasserts the MOSI line 412 (block 728). The host chip 402 then sends the address sequence signal 508 for the target of the hard reset on the clock line 410 (block 730). The subordinate chips 406(1)-406(M) evaluate the address (block 732) and if the address is correct, the subordinate chip 406(X) executes the hard reset (block 734). If the address is not correct, the subordinate chips 406(1)-406(M) end the process (block 736).

If the signal at block 626 is a global reset, the host chip 402 deasserts the MOSI line 412 (block 738) and the subordinate chips 406(1)-406(M) execute the global hard reset (block 740).

Note that legacy subordinate chips 404(1)-404(4) ignore the signals on the clock line 410 and the MOSI line 412 because the respective reset lines 418(1)-418(4) have not been activated. Thus, to send a targeted hard reset to a specific legacy subordinate chip 404(1)-404(4), the host chip 402 does not execute the process 720 and merely provides an appropriate signal on the appropriate reset line 418(1)-418(4). If a global hard reset is required, then the process 720 is executed concurrently with signaling on all the reset lines 418(1)-418(M).

Note that while the discussion above ascribes a specific number of toggles of the clock line 410 to differentiate between targeted and global soft and hard resets (e.g., one through four toggles), it should be appreciated that the assignment of a specific number of toggles to a specific command may be varied without departing from the present disclosure. Likewise, more toggles could be used if desired. Still further, a different number of toggles might be used to signal a reset for a specific subset of subordinate chips 406(1)-406(M).

Figure 8A:
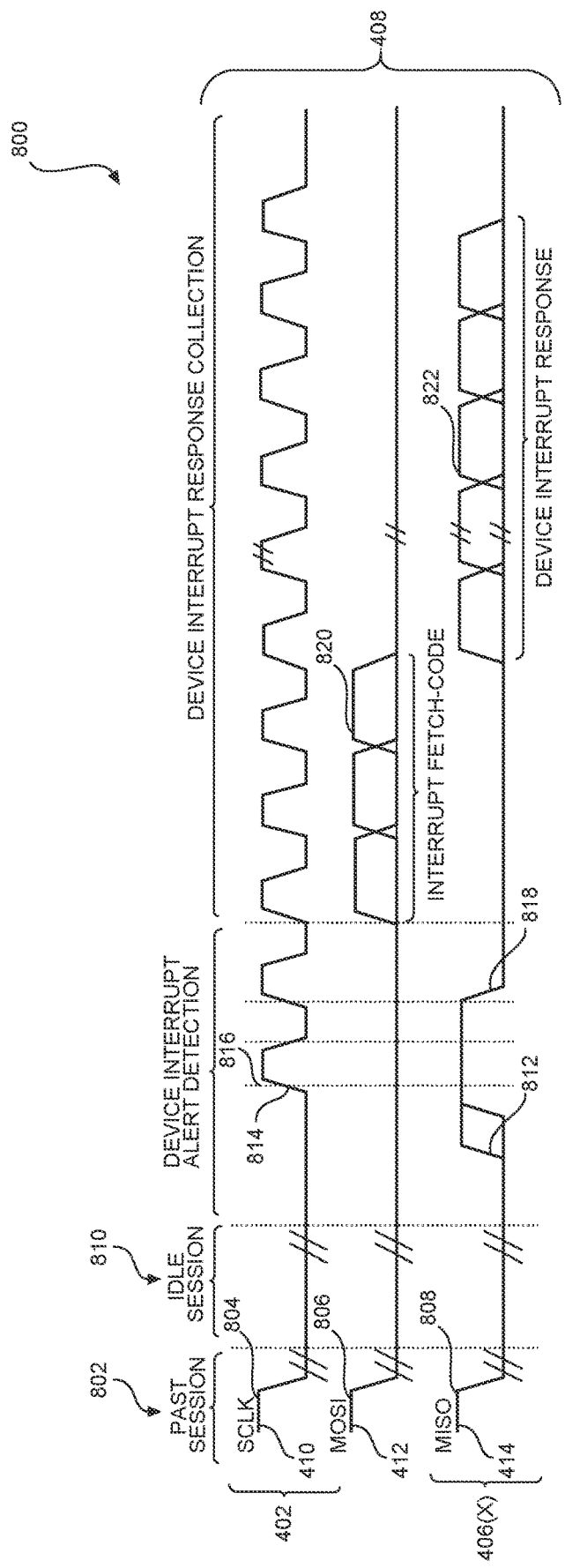
FIG. 8A is a signaling diagram showing possible interrupt sequences of the system of FIG. 4.
Figure 8B:
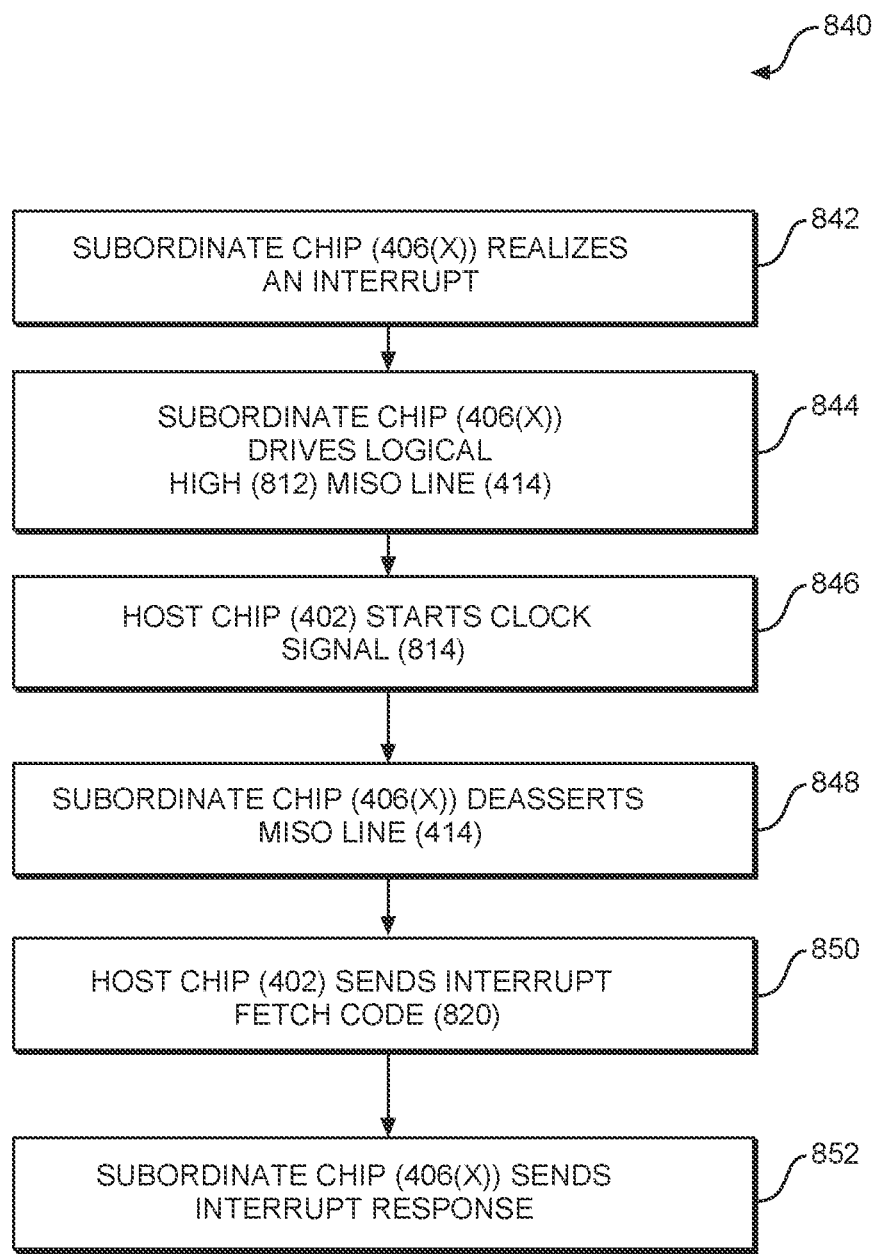
FIG. 8B is a flowchart showing a process corresponding to the signaling diagram of FIG. 8A.

FIGS. 8A and 8B illustrate a signaling diagram 800 and a process 840 relating to how a given subordinate chip 406(1)-406(M) may signal an interrupt condition to the host chip 402. The signaling diagram 800 begins with a past session 802, where the clock line 410 has a clock signal 804 thereon, and the host chip 402 and the subordinate chip 406(X) exchange signals 806 and 808 on the MOSI line 412 and MISO line 414, respectively. When the past session 802 concludes, an idle session 810 may be present on the SPI link 408 and the lines 410, 412, and 414 may be in an idle state (e.g., at a logical low). At some point during the idle session 810, the subordinate chip 406(X) may determine that it needs an interrupt function. The subordinate chip 406(X) drives the MISO line 414 to a logical high 812, which is detected by the AOC 428 of the host chip 402. The host chip 402, responsive to the logical high on the MISO line 414, starts the clock signal 814 on the clock line 410. After detection of a full clock cycle 816 on the clock line 410 by the subordinate chip 406(X), the subordinate chip 406(X) deasserts the MISO line 414 at 818. The host chip 402 sends an interrupt fetch code signal 820 on the MOSI line 412. The interrupt fetch code signal 820 is a command broadcast to all the subordinate chips 406(1)-406(M) that requests that any one of the subordinate chips 406(1)-406(M) that generated the logical high 812 provide an identifier and optionally details about the nature of the interrupt. The subordinate chip 406(X) that generated the logical high 812 will respond with a device interrupt response 822 that includes the address of the subordinate chip 406(X) and optionally a code indicative of the interrupt. Alternatively, the host chip 402 may then interrogate the subordinate chip 406(X) to get interrupt details.

Note that another option would be to modulate the logical high 812 into an interrupt flag signal (not shown) which includes information indicative of an address for the subordinate chip 406(X) and/or details about the interrupt.

The process 840 illustrated in FIG. 8B begins when the subordinate chip 406(X) realizes an interrupt (block 842). The subordinate chip 406(X) drives the logical high 812 on the MISO line 414 (block 844). The host chip 402 starts the clock signal 814 (block 846) and the subordinate chip 406(X) deasserts the MISO line 414 (block 848). The host chip 402 sends the interrupt fetch code 820 (block 850) and the subordinate chip 406(X) sends the interrupt response (block 852).

Because the legacy subordinate chips 404(1)-404(N) do not have the respective SS line activated, these signals on the MOSI line 412 are ignored by legacy devices 404(1)-404(4).

The systems and methods for chip operation with using serial peripheral interface (SPI) without reduced pin options according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 9:
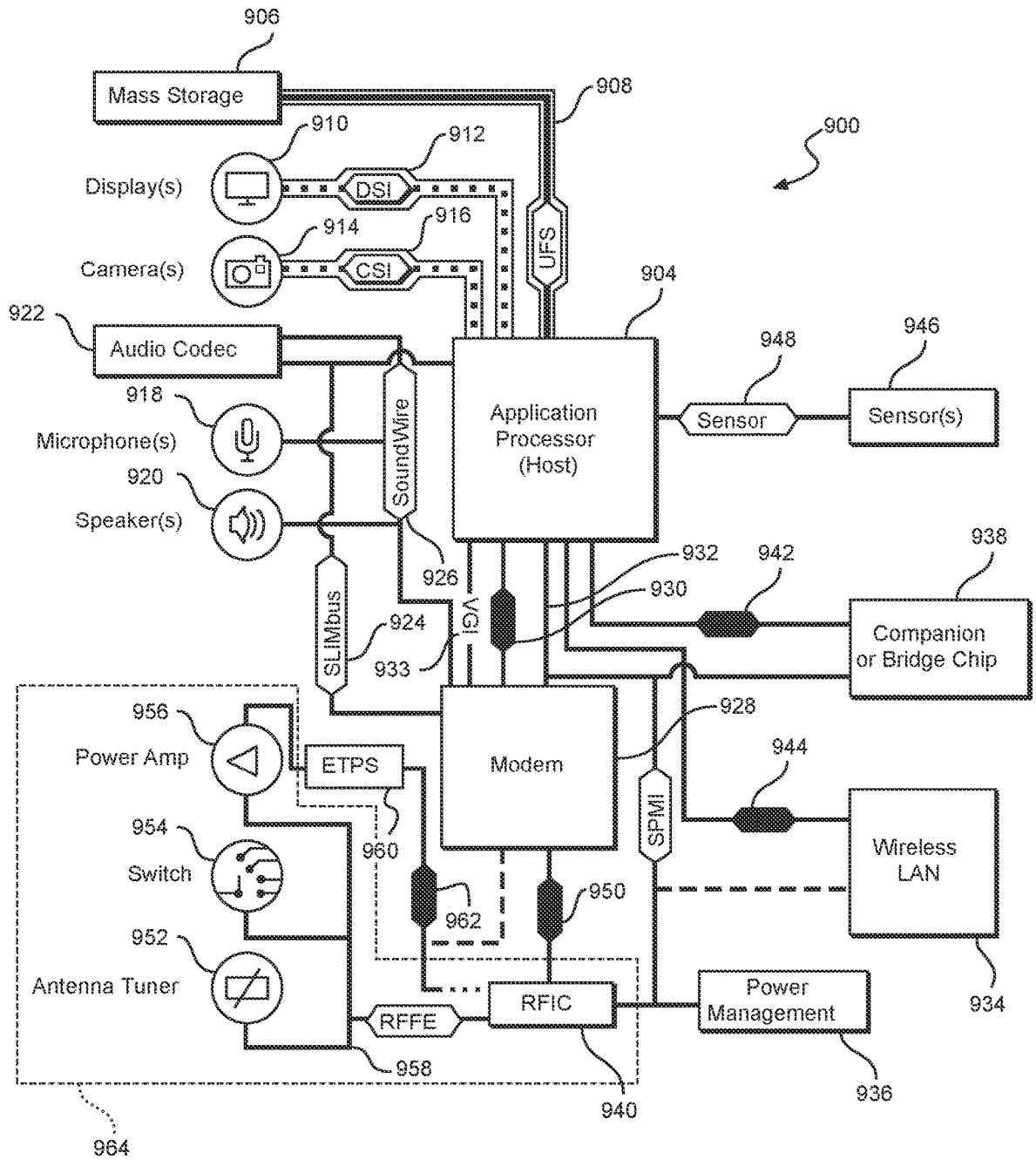
FIG. 9 is a block diagram of an exemplary mobile computing device that can include the system of FIG. 4.

In this regard, FIG. 9 is a system-level block diagram of an exemplary mobile terminal 900 such as a smart phone, mobile computing device tablet, or the like. While a mobile terminal s is particularly contemplated as being capable of benefiting from exemplary aspects of the present disclosure, it should be appreciated that the present disclosure is not so limited and may be useful in any system having an SPI bus.

With continued reference to FIG. 9, the mobile terminal 900 includes an application processor 904 (sometimes referred to as a host) that communicates with a mass storage element 906 through a universal flash storage (UFS) bus 908. The application processor 904 may further be connected to a display 910 through a display serial interface (DSI) bus 912 and a camera 914 through a camera serial interface (CSI) bus 916. Various audio elements such as a microphone 918, a speaker 920, and an audio codec 922 may be coupled to the application processor 904 through a serial low-power interchip multimedia bus (SLIMbus) 924. Additionally, the audio elements may communicate with each other through a SOUNDWIRE bus 926. A modem 928 may also be coupled to the SLIMbus 924 and/or the SOUNDWIRE bus 926. The modem 928 may further be connected to the application processor 904 through a peripheral component interconnect (PCI) or PCI express (PCI) bus 930 and/or a system power management interface (SPMI) bus 932.

With continued reference to FIG. 9, the SPMI bus 932 may also be coupled to a local area network (LAN or WLAN) IC (LAN IC or WLAN IC) 934, a power management integrated circuit (PMIC) 936, a companion IC (sometimes referred to as a bridge chip) 938, and a radio frequency IC (RFIC) 940. It should be appreciated that separate PCI buses 942 and 944 may also couple the application processor 904 to the companion IC 938 and the WLAN IC 934. The application processor 904 may further be connected to sensors 946 through a sensor bus 948, which may be an SPI bus. The modem 928 and the RFIC 940 may communicate using a bus 950.

With continued reference to FIG. 9, the RFIC 940 may couple to one or more RFFE elements, such as an antenna tuner 952, a switch 954, and a power amplifier 956 through a radio frequency front end (RFFE) bus 958. Additionally, the RFIC 940 may couple to an envelope tracking power supply (ETPS) 960 through a bus 962, and the ETPS 960 may communicate with the power amplifier 956. Collectively, the RFFE elements, including the RFIC 940, may be considered an RFFE system 964. It should be appreciated that the RFFE bus 958 may be formed from a clock line and a data line (not illustrated).

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered aspects/clauses:

1. An integrated circuit (IC) comprising:
   a bus interface comprising:
   a clock pin configured to couple to a clock line on an associated bus;
   a host-to-subordinate pin configured to couple to the associated bus; and
   a subordinate-to-host pin configured to couple to the associated bus; and
   a control circuit configured to:
   change a logical state of the host-to-subordinate pin;
   subsequently activate the clock line; and
   subsequently send an address and command through the host-to-subordinate pin.
2. The IC of clause 1, further comprising a legacy slave select pin.
3. The IC of clause 2, wherein the control circuit is further configured to hold the legacy slave select pin at a logical idle state while changing the logical state of the host-to-subordinate pin.
4. The IC of any previous clause, wherein the control circuit is further configured to, after sending the address and command, receive data from a subordinate chip through the subordinate-to-host pin.
5. The IC of any previous clause, wherein the bus interface comprises a serial peripheral interface (SPI) bus interface.
6. The IC of any previous clause, wherein the control circuit is configured to send commands to a plurality of subordinate chips through the host-to-subordinate pin.
7. The IC of any previous clause, wherein the control circuit is configured to use the host-to-subordinate pin and the clock pin to send a reset command to a subordinate chip.
8. An integrated circuit (IC) comprising:
   a bus interface comprising:
   a clock pin configured to couple to a clock line on an associated bus;
   a host-to-subordinate pin configured to couple to the associated bus; and
   a subordinate-to-host pin configured to couple to the associated bus; and
   a control circuit configured to:
   change a state on the host-to-subordinate pin from a logical idle state to an asserted state; and
   while holding the host-to-subordinate pin in the asserted state, toggle the clock pin a predetermined number of times to signal a reset.
9. The IC of clause 8, further comprising a legacy reset pin.
10. The IC of clause 9, wherein the control circuit is further configured to activate the legacy reset pin while signaling the reset on the clock pin.
11. The IC of any of clauses 8 to 10, wherein the control circuit is configured to signal a soft reset to a single subordinate chip using a first command on the clock pin.
12. The IC of clause 11, wherein the control circuit is configured to signal a global soft reset to a plurality of subordinate chips using a second command on the clock pin.
13. The IC of clause 11, wherein the control circuit is configured to signal a hard reset to a single subordinate chip using a third command on the clock pin.
14. The IC of clause 13, wherein the control circuit is configured to signal a global hard reset to a plurality of subordinate chips using a fourth command on the clock pin.
15. The IC of any of clauses 8 to 14, wherein the bus interface comprises a serial peripheral interface (SPI) bus interface.
16. An integrated circuit (IC) comprising:
   a bus interface comprising:
   a clock pin configured to couple to a clock line on an associated bus;
   a host-to-subordinate pin configured to couple to the associated bus; and
   a subordinate-to-host pin configured to couple to the associated bus; and
   a control circuit configured to:
   while in a logical idle state, detect a change of state on the subordinate-to-host pin caused by a subordinate chip; and
   responsive to the change of state on the subordinate-to-host pin, start a clock signal on the clock pin.
17. The IC of clause 16, wherein the control circuit is further configured to, after detection of the change in state, drive the subordinate-to-host pin to a logically opposite state.
18. The IC of clause 16 or 17, wherein the control circuit is further configured to send a fetch code on the host-to-subordinate pin.
19. The IC of clause 18, wherein the fetch code comprises an identifier request.
20. The IC of clause 19, wherein the control circuit is further configured to receive a subordinate identifier from the subordinate chip responsive to the fetch code.
21. The IC of clause 18, wherein the fetch code comprises an identifier with interrupt clarification request.
22. The IC of clause 21, wherein the control circuit is further configured to receive a subordinate identifier and an interrupt identification code responsive to the fetch code.
23. The IC of clause 18, wherein the fetch code comprises an identifier and interrupt command request.

24. The IC of clause 23, wherein the control circuit is further configured to receive a subordinate identifier, an interrupt identification code, and a remediation command responsive to the fetch code.
25. A system comprising:
   a subordinate chip;
   a bus coupled to the subordinate chip; and
   a host chip comprising:
      a bus interface coupled to the bus, the bus interface comprising:
         a clock pin configured to couple to a clock line on the bus;
         a host-to-subordinate pin configured to couple to the bus; and
         a subordinate-to-host pin configured to couple to the bus; and
      a control circuit configured to do, at different times, each of the three following:
         1) change a logical state of the host-to-subordinate pin; subsequently activate the clock line; and subsequently send an address and command through the host-to-subordinate pin to indicate a chip select to the subordinate chip;
         2) change a state on the host-to-subordinate pin from a logical idle state to an asserted state; while holding the host-to-subordinate pin in the asserted state, toggle the clock pin a predetermined number of times to signal a reset to the subordinate chip; and
         3) while in the logical idle state, detect a change of state on the subordinate-to-host pin caused by the subordinate chip; and responsive to the change of state on the subordinate-to-host pin, start a clock signal on the clock pin.

What is claimed is:
1. An integrated circuit (IC) comprising: a bus interface comprising: a clock pin configured to couple to a clock line on an associated bus; a host-to-subordinate pin configured to couple to the associated bus; and a subordinate-to-host pin configured to couple to the associated bus; a legacy slave pin; and a control circuit configured to: change a logical state of the host-to-subordinate pin; subsequently activate the clock line; and subsequently send an address to a subordinate chip and a command through the host-to-subordinate pin without activating the slave select pin.
2. The IC of claim 1, wherein the control circuit is further configured to hold the legacy slave select pin at a logical idle state while changing the logical state of the host-to-subordinate pin.
3. The IC of claim 1, wherein the control circuit is further configured to, after sending the address and the command, receive data from the subordinate chip through the subordinate-to-host pin.
4. The IC of claim 1, wherein the bus interface comprises a serial peripheral interface (SPI) bus interface.
5. The IC of claim 1, wherein the control circuit is configured to send commands to a plurality of subordinate chips through the host-to-subordinate pin.
6. The IC of claim 1, wherein the control circuit is configured to use the host-to-subordinate pin and the clock pin to send a reset command to the subordinate chip.
7. An integrated circuit (IC) comprising:
   a bus interface comprising:
      a legacy reset pin;
      a clock pin configured to couple to a clock line on an associated bus;
      a host-to-subordinate pin configured to couple to the associated bus; and
      a subordinate-to-host pin configured to couple to the associated bus; and
   a control circuit configured to:
      change a state on the host-to-subordinate pin from a logical idle state to an asserted state; and
      while holding the host-to-subordinate pin in the asserted state, toggle the clock pin a predetermined number of times to signal a reset; wherein the control circuit is configured to signal a soft reset to a single subordinate chip using a first command on the clock pin.
8. The IC of claim 7, wherein the control circuit is further configured to activate the legacy reset pin while signaling the reset on the clock pin.
9. The IC of claim 7, wherein the control circuit is configured to signal a global soft reset to a plurality of subordinate chips using a second command on the clock pin.
10. An integrated circuit (IC) comprising:
   a bus interface comprising:
      a legacy reset pin;
      a clock pin configured to couple to a clock line on an associated bus;
      a host-to-subordinate pin configured to couple to the associated bus; and
      a subordinate-to-host pin configured to couple to the associated bus; and
   a control circuit configured to:
      change a state on the host-to-subordinate pin from a logical idle state to an asserted state; and
      while holding the host-to-subordinate pin in the asserted state, toggle the clock pin a predetermined number of times to signal a reset; wherein the control circuit is configured to signal a hard reset to a single subordinate chip using a third command on the clock pin.
11. The IC of claim 10, wherein the control circuit is configured to signal a global hard reset to a plurality of subordinate chips using a fourth command on the clock pin.
12. The IC of claim 7, wherein the bus interface comprises a serial peripheral interface (SPI) bus interface.
13. An integrated circuit (IC) comprising:
   a bus interface comprising:
      a clock pin configured to couple to a clock line on an associated bus;
      a host-to-subordinate pin configured to couple to the associated bus; and
      a subordinate-to-host pin configured to couple to the associated bus; and
   a control circuit configured to:
      while in a logical idle state, detect a change of state on the subordinate-to-host pin caused by a subordinate chip; and
      responsive to the change of state on the subordinate-to-host pin, start a clock signal on the clock pin without activating a slave select pin and drive the subordinate-to-host pin to a logically opposite state.
14. The IC of claim 13, wherein the control circuit is further configured to send a fetch code on the host-to-subordinate pin.
15. The IC of claim 14, wherein the fetch code comprises an identifier request.
16. The IC of claim 15, wherein the control circuit is further configured to receive a subordinate identifier from the subordinate chip responsive to the fetch code.

17. The IC of claim 14, wherein the fetch code comprises an identifier with interrupt clarification request.

18. The IC of claim 17, wherein the control circuit is further configured to receive a subordinate identifier and an interrupt identification code responsive to the fetch code.

19. The IC of claim 14, wherein the fetch code comprises an identifier and interrupt command request.

20. The IC of claim 19, wherein the control circuit is further configured to receive a subordinate identifier and an interrupt identification code responsive to the fetch code.

21. A system comprising: a subordinate chip; a bus coupled to the subordinate chip; and a host chip comprising: a bus interface coupled to the bus, the bus interface comprising: a clock pin configured to couple to a clock line on the bus; a host-to-subordinate pin configured to couple to the bus; and a subordinate-to-host pin configured to couple to the bus; a legacy slave select pin; and a control circuit configured to do, at different times, each of the three following: 1) change a logical state of the host-to-subordinate pin; subsequently activate the clock line without activating the slave select pin; and subsequently send an address and command through the host-to-subordinate pinto indicate a chip select to the subordinate chip; 2) change a state on the host-to-subordinate pin from a logical idle state to an asserted state; while holding the host-to-subordinate pin in the asserted state, toggle the clock pin a predetermined number of times to signal a reset to the subordinate chip; and 3) while in the logical idle state, detect a change of state on the subordinate-to-host pin caused by the subordinate chip; and responsive to the change of state on the subordinate-to-host pin, start a clock signal on the clock pin.

\* \* \* \* \*